Dec. 3, 1963  F. M. LINDLEY  3,113,304
PEST CONTROL DEVICE
Filed June 9, 1960  2 Sheets-Sheet 1
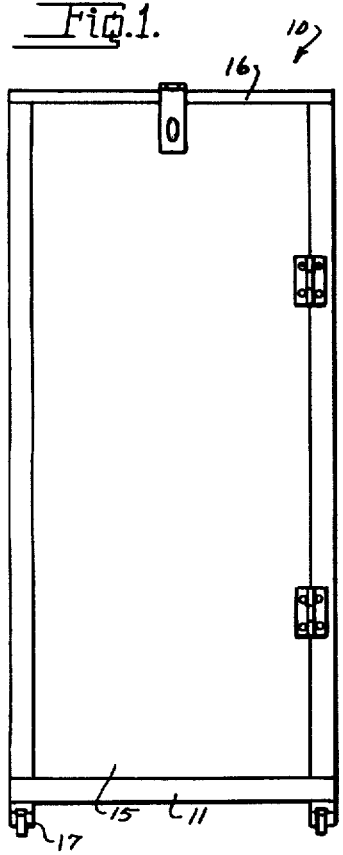
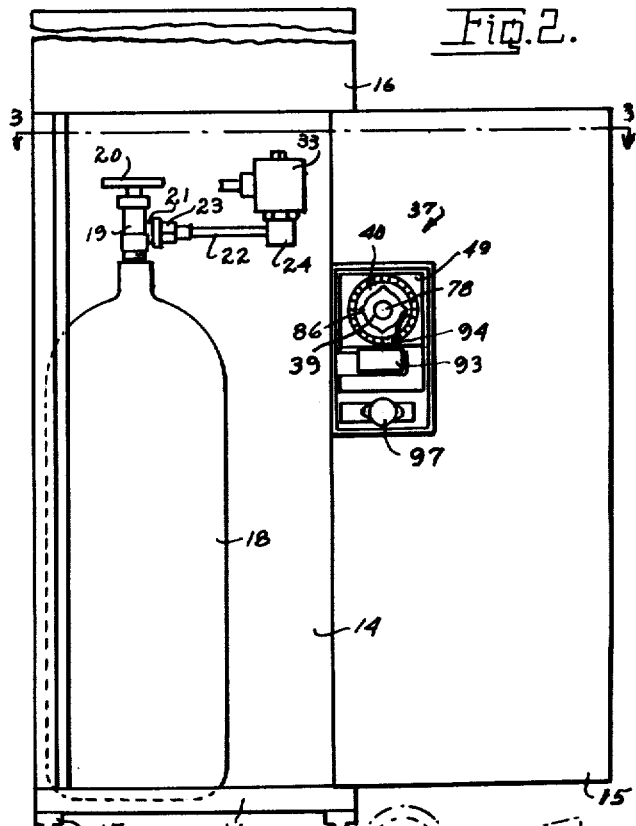
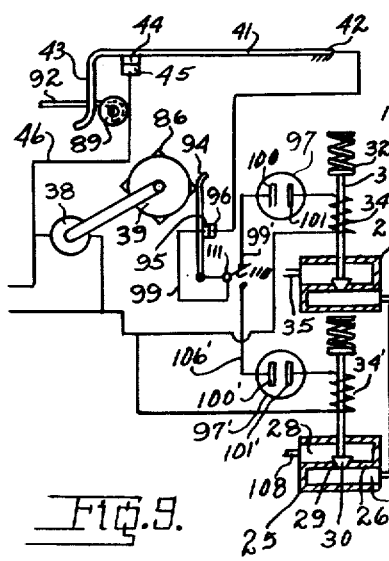
INVENTOR.
FRANK M. LINDLEY
BY
Joseph A. Rave
Attorney Dec. 3, 1963  F. M. LINDLEY  3,113,304
PEST CONTROL DEVICE
Filed June 9, 1960  2 Sheets-Sheet 2

INVENTOR.
FRANK M. LINDLEY
BY
Joseph A. Pave
Attorney

United States Patent Office 3,113,304
Patented Dec. 3, 1963

3,113,304
PEST CONTROL DEVICE
Frank M. Lindley, Cincinnati, Ohio, assignor to Lindley's Electronic Enterprises, Inc., Cincinnati, Ohio, a corporation of Ohio
Filed June 9, 1960, Ser. No. 35,068
7 Claims. (Cl. 340—384)

This invention relates to improvements in a pest control device, that is, a device for discouraging birds from roosting in undesirable places.

It is a well known fact that birds such as starlings, pigeons, and the like, have the habit, particularly in the seasons other than mid-summer, of roosting in urban areas and particularly on the window sills, cornice, and the like, of buildings with the result that a terrific maintenance and cleaning problem and expense ensues. This same condition obtains in large display, or "spectacular," sign and particularly where a perch may be found due to the structure of said sign.

Various types of control devices including noise makers have been employed to discourage the roosting of said birds but said devices have often proven either ineffective, too expensive to operate, or a greater nuisance than the birds themselves.

By the present invention a relatively inexpensive "bird chaser" has been developed and which has proven quite effective in operation and very economical to maintain and operate.

The principal object of the present invention is, therefore, the provision of a pest control device that will effectively cope with the problem of roosting birds in places where it is undesirable to have them roost.

Another object of this invention is the provision of a device for accomplishing the foregoing object that is economical to produce, maintain and operate.

Another object of this invention is the provision of a pest control device that may be selectively set up for controlling different species of birds since their reactions to different disturbances are individual to the said bird species.

Other objects and advantages of the presnt invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 1 is a front elevational view of the pest control mechanism of the present invention illustrating same in its normal position.

FIG. 2 is an elevational view of the device of FIG. 1 illustrating the same in position for service and illustrating the operative mechanism thereof.

FIG. 3 is a transverse sectional view through the open device of FIG. 2 as seen on line 3—3 on said FIG. 2.

FIG. 4 is an enlarged plan view of a clock mechanism forming a detail of the invention, parts being broken away in FIG. 4 in the interest of clearness of illustration.

FIG. 5 is a vertical, sectional view through the clock mechanism of FIG. 4 as seen from line 5—5 on said FIG. 4.

FIG. 6 is a view through a portion of FIG. 4 illustrating certain mechanism operated by the clock with said view being taken on line 6—6 of said FIG. 4.

FIG. 7 is a diagrammatic view illustrating a wiring diagram used in the operation of the device of this invention.

FIG. 8 is a wiring diagram similar to FIG. 7 showing a modification in the device.

FIG. 9 is a wiring diagram similar to FIGS. 7 and 8 showing a further modification of the device.

Throughout the several views of the drawings similar reference characters are employed to denote the same or similar parts.

Primarily, the pest control device, bird roosting discouraging mechanism, of the present invention utilizes a vibrating or oscillating member accompanied by a slight noise which is annoying and startling to said birds, such as starlings and the like, and with a loud "shot like" report which is particularly advantageous with birds of the pigeon species which are not necessarily disturbed by a moving object and a more gentle noise accompanying the same.

The mechanism of the present invention will find its use on window sills and as a dependant from the edges thereof and requires the operating mechanism therefor to be interiorly of the room and, at the same time, the device of the present invention may be desirably, or of necessity, be shifted from room to room.

Specifically the operating mechanism of the device of the present invention is housed in a cabinet indicated in its entirety by the reference numeral 10 and which cabinet comprises a base 11 from the lateral edges of which upstand sides 12 and 13 having their rear edges joined by a back 14. The front of the cabinet is provided by a hinged door 15 while the top 16 is likewise a hinged member and through which door 15 and top 16 access to the interior of the cabinet is obtained.

The base or bottom 11 of the cabinet may have depending from the four corners thereof casters 17 and through which the cabinet is made mobile.

Disposed within the cabinet on the base or bottom 11 is a tank 18 containing gas under pressure. It has been found that an acceptable, yet relatively inexpensive gas, may take the form of carbon dioxide ($CO_2$) which will maintain its pressure until the gas has been substantially completely exhausted from the container. For retaining the gas within the tank 18 and yet control its discharge the tank is provided at its upper end with a shut off valve 19 under the control of a knob or handle 20. As is customary the valve 19 has projecting from one side thereof an externally threaded nipple 21 to which is connected a discharge pipe 22.

The discharge pipe 22 is connected with the valve 19, particularly the nipple 21, through a coupling or union nut 23. The conduit 22 terminates in an electro-magnetic control valve 24 and which valve may take any usual or accepted design and construction.

The valve 24 is diagrammatically illustrated in FIGS. 7 and 8 and as there shown comprises a valve body 25 having an interior partition 26 thereby providing an intake chamber 27 and an outlet or exhaust chamber 28 within the valve body. The partition 26 is provided with an opening including a valve seat 29 through which communication between the chambers 27 and 28 is effected. The said opening in the partition 26 is controlled by a valve 30 cooperating with the valve seat 29.

The valve 30 has extending therefrom a valve stem 31 with which cooperates a compression spring 32 for normally maintaining the valve 30 on the valve seat 29 and prohibiting flow through the valve body 25. The valve stem 31, in practice, also acts as the core for an electro-magnetic solenoid 33. As shown in said FIGS. 7 and 8 the solenoid 33 has its solenoid coil 34 extending around the valve stem 31 so that upon energization of the said coil 34 the valve is raised from its seat 30.

The energization and operation of the solenoid 33, particularly the coil 34, thereof, is under the control of an electric time-clock so that the said valve 24 is periodically operated for periodically operating the bird chasing element and thereby keep the birds on the move and against roosting in the undesirable places and areas with which the said control device is associated.

It should be noted that the valve 24 has connected with its discharge chamber 28 a pipe or conduit 35 which is brought to the exterior of the cabinet 10, preferably, through the back 14, as illustrated in FIG. 3. The outer end of the pipe or conduit 35 has secured thereto a hollow flexible member 36 which conveniently takes the form of a flexible rubber hose, or a hose formed of flexible synthetic materials such as plastic, all as is well known. The said flexible member 36 has a relatively small diameter bore to offer some resistance to the flow of the gas from the tank 18 therethrough. The flexible member or hose 36 has considerable length, in the nature of four to seven or eight feet, and the flow of the gas through the relatively small bore thereof causes the hose to swing or oscillate from side to side and at the same time to assume a reversely curved serpentine condition which, while oscillating or "swishing" from side to side, has the serpentine or reverse curves thereof straightened out and immediately again formed for thereby creating or causing a scraping or sweepish noise during its movement. At the same time the gas in issuing from the free end of the hose 36 sets up a disturbing noise for causing any roosting bird to take flight and at the same time discourage lighting of birds on the wing and in the vicinity.

It has been found that the operation of the hose or tube 36 need be effected but for a very short space of time and at spaced intervals for thereby not only chasing the birds but also reducing the annoyance to individuals in the vicinity of the device and also reducing the amount and cost of the compressed gas used to a minimum since but a minimum amount of the gas will be used.

The operation of the valve 24 and its solenoid 33 is effected by a time-clock mechanism indicated in its entirety by the reference numeral 37. This time-clock mechanism is available on the market and requires but a few minor modifications to effectively adapt it to the use herein described.

Specifically the time-clock as obtainable on the market includes an electric motor, diagramatically illustrated in FIGS. 7 and 8 and indicated by the reference numeral 38, which through suitable gearing, not shown, drives a pair of superimposed discs 39 and 40. It should be noted that the gearing from the clock motor 38 bear a ratio and relationship to one another such that the disc 39 is given a complete single rotation each hour while the disc 40 is given but a twenty-fourth of a rotation each hour, or, the disc 40 is given one complete rotation each twenty-four hours.

The clock mechanism has associated therewith, what may be termed, a master switch, see FIGS. 7 and 8, including a spring switch arm 41 oscillatable about one end as at 42, and having at its other end a control or operating finger 43. The spring switch arm 41 intermediate its ends, is provided with a contact 44 which is adapted to be engaged with and disengaged from a fixed contact 45 having connected therewith one end of a wire 46 extending from a suitable electric current source; the said current source is normally a 110 volt A.C. outlet socket found in the buildings wherewith the present device is employed and with the said wire 46 terminating in one prong of the usual housing appliance pronged plug.

The main or master switch, including switch contacts 44 and 45, is adapted to be closed for only a certain portion of each twenty-four hours since it is not needed for the entire twenty-four hour range. In other words, starlings, pigeons, and the like, come in to roost only through a certain time each evening and which time is dependent upon the season of the year. In the winter the time for finding a roosting place may commence as early as six o'clock p.m. and extend for a period of several hours thereafter. While, as the winter progresses and spring approaches the roosting time commences at a later hour but again lasting for a period of several hours. It is only during this "settling in" period that the device need operate and as will later be made clear the mechanism of the present invention is adjustable to these periods.

To accomplish the foregoing operation the clock mechanism is provided with a master or main switch setting or cocking arm 47 which is secured at 48 to a portion of the clock casing, particularly a plate 49. The cocking arm 47 is provided with an upstanding finger or abutment 50 through which it is actuated or cocked and the said cocking arm 47 is provided with a depending finger 51 with which is connected a spring means adapted to be loaded during the cocking of the arm and for a purpose subsequently to be made clear.

Pivotally carried by the cocking arm 47 as at 52 is a latch plate 53 including a latch shoulder 54 to cooperate with a finger 55 of an actuator that actuates the switch spring arm 41. Pivotally mounted as at 56 on the clock frame or plate 49 is a trigger 57 including a shoulder 58 which cooperates with the cocking arm depending finger 51 for retaining the cocking arm in its cocked position.

The pivot 56 conveniently provides a mounting for a tension spring 59 which has its one arm 60 connected with a lug 61 on the trigger 57 for operating the said trigger 57 in a counter-clockwise direction while a second arm 62 of the said spring 59 is engaged with a lug 63 on the latch plate 53 for likewise yieldably actuating said latch plate in a counter-clockwise direction.

In order to operate the switch arm mechanism, as just described, the clock main output or central shaft 64 has mounted thereon a sleeve 65 having secured to or integral with its lower end an arm 66. The arm 66 as seen in FIG. 4 has an operating end or finger 67 which, as will presently be made clear, engages the lug or abutment 63 on the latch plate 53 for actuating said latch plate against the yielding resistance of spring arm 62.

The said output or central shaft 64, is provided for the length thereof outwardly of the clock frame or plate 49 with flats 69 on each side and received on said flats, that is, keyed to the shaft 64 by the flats, is an arm 70 having at its free end a finger 71 which operates the trigger 57 through the engagement of the said finger 71 with an abutment 72 on the triger 57 all as will presently be made clear.

The sleeve 65 at its outer end is provided with flats 73 and through which there is keyed to the sleeve 65 a disc 74 having at one point a notch 75 inwardly of its periphery and in which notch is disposed a depending finger 76 of a second disc 77 carried by a knob 78 which is, preferably, integral with the dial 39.

Mounted on the sleeve 65 for independent rotation is the dial 40 having secured to its under surface a clock gear 79. It should be noted that the dial 40 and clock gear 79 are secured to one another to provide a unit and which securement is effected through a sleeve 80 mounted on the said sleeve 65 intermediate the ends thereof, that is, mounted between the latch plate actuating arm 66 and disc 74, respectively, at the inner and outer ends of the sleeve 65.

The dial 40 is provided inwardly of its outer periphery with tapped apertures 81 and with said apertures being located relative to the hour marks of the said dial 40. Disposed in each of certain of the tapped apertures 81 is a similar thumb screw indicated in its entirety by the reference numeral 82. Said thumb screws are each identical in construction and each is provided intermediate its end with a threaded portion 83 from which inwardly projects a pin portion 84 and outwardly of which threaded portion is an actuating head 85.

The dial 39 is provided at equally spaced intervals on its periphery with a projecting lug 86, there being shown on the drawings four of the said lugs 86 but a greater or lesser number of said lugs may be desirable.

The dial 40 is provided on its face with indicia 87 indicating the hour of the day with the mark or point on the dial at 12 midnight being marked "midnight" while the point at diametrically opposite thereto is marked "noon" and the hour marking in between said "midnight" and "noon" being indicated by numerals of the a.m. and p.m. The said markings cooperate with a pointer 88 conveniently positioned at the upper left hand corner of the clock case or plate 49.

It should be noted the clock mechanism sets the switch to close on the hour and to remain closed for a given period of time, for example, 55 minutes, whereupon the switch is opened and is reclosed at the commencement of the next hour if it is so desired. As noted above sundown in the winter is fairly early in the evening, even before 6 p.m., and at which time the birds seek a roost for the night, while, again as noted above, as spring and summer arrive sundown occurs at a later hour even after 8 p.m. and wherefore the birds do not seek a roost until said later hour. Whether sundown occurs in late afternoon or early evening or late in the evening the birds are seeking a roost for several hours after sundown wherefore the bird chaser is arranged to be operative through the said several hours of finding a roost regardless of the hour of sundown.

For this reason the control switch of the present invention is operated each hour for the successive several hours commencing approximately with sundown. The means for operating the switch at each hour is effected through one of the thumb screws 82 and particularly through its projecting reduced or pin portion 84. This switch operation is as follows:

As illustrated in the drawings, particularly FIG. 4, each of the hour indications from six to ten before midnight has associated therewith a thumb screw 82 and as six o'clock p.m. approaches the pin or reduced portion 84 associated therewith arrives at its station to engage the finger or abutment 50 of cocking arm 47 and moves it to the left on its pivot 48. This movement is continued until the cocking arm depending finger or abutment 51 is beyond the latch shoulder 58 whereupon the latch 57 through the spring arm 60 is yieldably shifted to drop the said shoulder 58 behind the finger 51 and retain the cocking arm 47 in this, its cocked, position.

The movement of the cocking arm 47 on the pivot 48 carried with it the latch plate 53 until its shoulder 54 was beyond the switch arm actuator finger 55, and since the said latch plate 53 is under the influence of spring arm 62 the said latch plate shoulder 54 is forced behind the said switch arm actuator finger 55.

The switch arm actuator takes the form of a circular member 89, see FIGS. 7 and 8, that cooperates with the cam like operating finger 43 on the end of the switch arm 41. In its normal position the switch arm actuator 89 has the dotted line position 90 thereof illustrated in said FIGS. 7 and 8, and it is this position of the parts when the cocking arm 47 is shifted to its cocked position and is engaged, though the latch plate 53, with the switch arm actuator finger 55, and the parts are retained in these positions by the trigger 57 It will be noted that the normal position of the switch spring arm 41 is to open the switch contacts 44 and 45.

The parts remain in this position for a very short time whereupon the cocking arm 47 is released by the trigger 57 which through the latch plate operates the switch actuator to a position to permit closing of the switch, said actuator then having the solid line position illustrated in FIGS. 7 and 8. The trigger release is effected through the arm 70 on the main shaft 64 which through its finger 71 engaging the trigger abutment 72 actuates the trigger against the yielding resistance of spring arm 60 for raising the trigger abutment 58 clear of the cocking arm finger or abutment 51 and permitting the spring 91, associated with said cocking arm 47, see FIG. 6, to shift same to the position illustrated in FIG. 4, and since at this time the latch 53 has its shoulder 54 behind the switch arm actuator finger 55 and the latch 53 moves with the cocking arm 47 the said switch actuator 89 is accordingly moved for permitting the said switch arm to close.

The parts, as noted above, remain in this position for the greater portion of the ensuing hour, fifty five minutes, for example, whereupon the arm 66 through its actuating end or finger 67 engages the latch plate abutment 68 and oscillates the latch plate 53 to release the switch arm actuator finger 55 and permit the said switch actuator to be operated by the spring 92, loaded during the operation of the cocking arm, to open the same.

The switch actuator is operated through the above cycle by each of the thumb screws 82 associated with the dial markings for the hours seven, eight and nine after which the switch remains open from approximately 10 p.m. until 6 p.m. the next afternoon or evening, it is obvious that additional thumb screws may be supplied for succeeding hours but is believed unnecessary since, it has been observed, as was noted above, that within a period of approximately four hours from approximately sundown the birds have found a roost for the night. From this it follows that as the seasons progress from the winter season and as sundown occurs later in the evening the thumb screw associated with the six o'clock marking may be removed and associated with the ten o'clock marking so that the bird chaser is in operation between the hours of 7 p.m. and 11 p.m. and obviously still later in the year the thumb screw may be shifted from the seven o'clock marking to the 11 o'clock p.m. marking thereby having the bird chaser in operation for the hours from 8 p.m. to midnight.

Associated with the clock mechanism is a make and brake switch 93 from which extends a switch actuator arm 94. The switch 93 may be termed a "micro-switch" and is illustrated in FIGS. 7 and 8 as a pair of contacts 95 and 96 with said contact 95 being movable with the arm 94.

Also associated with the clock mechanism is an electronic tube 97, actually a delay relay switch.

As illustrated in said FIGS. 7 and 8 the micro switch contact 96 has connected therewith one end of a wire 98 that extends from the control switch movable arm or blade 41 and therefore from the movable contact 44 of the said clock control switch. The second switch contact 95 of the micro switch 93 is connected by a wire 99 to one element 100 of the electronic tube 97 while the second element 101 of the said electronic tube 97 is connected by a wire 102 with the valve solenoid coil 34. The other end of the solenoid coil 34 is connected by a wire 103 to the current source, namely the normal house outlet.

The micro switch actuating arm 94 is adapted to be operated by the lugs 86 on the dial 39 and is the immediate control mechanism for the bird chaser.

It should be noted that the electronic tube 97, delay relay, is such that it maintains a current flow therethrough for a short period of time, such as five seconds, after which it automatically opens. The said delay relay, in one commercial form, includes a heat responsive element which requires approximately five seconds to attain the operating heat whereupon the contacts therein are separated from one another to interrupt the current flow therethrough.

The operation of the bird chaser is believed obvious from the foregoing but briefly is as follows:

Assuming the clock controlled switch contacts 44 and 45 are in current passing position, the current flow from the electric current source will be by way of wire 46, closed contacts 44 and 45, switch arm or blade 41, wire 98 to the micro switch contact 96. Assuming now that one of the projections 86 on the dial 39 is in position to operate the switch arm 94 and close contacts 95 and 96 of the micro switch, the current flow from the contact 96 will be through contact 95, wire 99, time delay relay elements 100 and 101 of the electronic tube 97, wire 102, valve solenoid coil 34 and wire 103 back to the electric current source. This current flow will energize the solenoid coil 34 of the electro-magnet 33 for opening the valve 24 and permitting a gas flow therethrough from the tank 18 and effect the operation of the bird chaser element 36 as above noted.

This element 36 will operate for the period of time permitted by the electronic tube 97, which, as set forth above, is approximately five seconds. The opening of the elements 100 and 101 will brake the electric circuit and de-energize the solenoid coil 34 whereupon the spring 32 will close valve 30 to prevent any further gas flow from the tank 18.

It is understood that during this operation the clock is continuing to operate and that the projection 86 which operated the switch arm 94 is passing from beneath the switch arm so that it will assume its normal position and thereby open the contacts 95 and 96 and thereby permit the cooling of the electronic tube 97 and return of the parts of said tube to their normal positions.

As was noted above the clock mechanism is such that the dial 39 is given a single complete revolution each hour and since the said dial is provided, as illustrated in FIG. 2, with four projections 86 the bird chaser element 36 will be operated every fifteen minutes for a relatively short time. It has been found in practice that this operation of the bird chaser element once every fifteen minutes for the time that the birds are attempting to find a roost for the night is sufficient to keep the birds from roosting in the places protected thereby. It is to be understood however that additional projections such as 86 may be added to the dial 39 so that the chaser element 36 is operated at closer intervals than fifteen minutes.

As noted above certain birds, such as starlings, are susceptible to the rapid movement of the element 36, as above set forth, and the swishing accompanying said movement while other birds such as pigeons are not necessarily or particularly disturbed thereby but are disturbed and readily chased by a short loud report. Obviously the device above described may be modified by substituting for the swishing element 36 an element that would give off a "shot like" loud report upon the passing therethrough of gas from the tank 18. This type of mechanism would require a different form of control device than the electronic tube 97 such as a tube similar in all respects but which would permit only the instantaneous passage across its elements of an electric current whereupon it would open and which device would open the valve 30 to have same substantially immediately closed but which opening would permit a blast of gas under pressure to operate the signal.

It is also contemplated to provide a single mechanism incorporating therein both the swishable element 36 and the shot like report element and which mechanism is diagrammatically illustrated in FIG. 8.

The modified mechanism in FIG. 8 consists in supplying a second electro-magnetic valve 104, similar in all respects to the valve 25 above set forth. The said second valve 104 would have its electro-magnetic coil 34' connected at one end through a wire 105 with one element 101' of a second electronic tube 97' and whose second element 100' is connected by a wire 106 with the wire 99 from the micro switch 93.

The electronic tube 97' operates substantially in reverse of that of tube 97, namely, its time delay is effected prior to the closing of the contacts of the elements 100' and 101' instead of opening said elements. Furthermore the said elements 100' and 101' would have their contacts immediately broken for immediately breaking the electric circuit therethrough.

The second solenoid valve 104 has its intake connected by a pipe or conduit 107 with the pipe or conduit 22 and therefore the tank 18 and said valve 104 has its discharge side connected by a pipe 108 with the shot like report producing element 109.

In the modified device as diagrammatically illustrated in FIG. 8 the shot like report device 109 would be operated after the operation of the swishable element 36 and there- by effect the chasing of all roosting, or attempting to roost, birds within the vicinity.

The modification of the device as illustrated in FIG. 9 affords the user the choice of employing either the flexible and swishable member 36 or the shot like report producing element 109. Specifically, the modified construction consists in providing a manually operable selecting switch 110, which may be of the single pole, double throw variety, with its movable contact 111 connected with the wire 99 from the microswitch contact 95 and having its movable element selectively connectable with the contact from which wire 99' extends or with the contact from which wire 106' extends. In the wiring diagram in FIG. 9 the wire 99' terminates in the element 100 of electronic tube 97 while the wire 106' terminates in the element 100' of electronic tube 97'.

The operation of FIG. 9 is believed obvious, in view of the above description, since with the switch 110 in the position illustrated the flexible and swishable element 36 will be operated while the shot like report producing element 109 will be inoperative and a shifting of the switch 110 to its second position will cause an operation of the shot like report producing element 109 and render inoperative the flexible and swishable element 36.

Obviously if a "shot like" device only were desired the said element 109 may be substituted for the flexible and swishing element 36 in FIGS. 2 and 3 and the proper substitution of the electronic tube effected, as above set forth.

As was noted above the device of the present invention is operated from within the building by passing the swishable element 36 through a window onto the window sill or to hang from the window sill, and it has been found that the device is quite effective for controlling roosting on adjacent window sills even to the extent of two window sills removed from that at which the element 36 is placed. In view of the mobility of the device of the present invention it may be shifted from window to window or room to room either during the same roosting period or on successive nights for thereby controlling relatively large areas with a single device.

Obviously the gas tank 18 will in time be drained of its gas but since the tank 18 is a standard commercial product it can be readily replaced with a fully charged tank. Said replacement requiring merely the closing of the stop cock or valve 19 and the uncoupling therefrom of the nut 23 whereupon the spent tank may be removed from the cabinet and a freshly charged tank placed therein and connected through the nut 23 with the control valve 24.

From the foregoing it is believed now evident there has been provided a device for accomplishing the objects initially set forth.

What is claimed is:

1. In a device of the class described the combination of a container of gas under pressure, a conduit from said gas container for conveying the gas therefrom, a hollow flexing and swishing member capable of creating a disturbance connected with said conduit and through which member said gas passes thereby causing the flexing movement and swishing of said member, a normally closed electro-magnetically operable valve controlling the flow of the gas through the conduit and the flexible and swishing member, an electric circuit, a first make and break switch in said electric circuit effecting the operation of the electro-magnetic valve, a second make and break switch in said electric circuit for completing the same, a continuously operating clock mechanism, a first time cycle means operated by the clock mechanism through a complete cycle in a given length of time, a second time cycle means operated by the clock mechanism through a complete cycle of time and which said second mechanism through a complete cycle of time and which said second time cycle is a fragment of the time cycle of said first time cycle means, means associated with said second time cycle means for operating the first mentioned make and break switch at intervals during the time cycle thereof, and means associated with said first time cycle means closing said second make and break switch for completing the electric circuit and making same operative for a part of the time cycle of said first time cycle means.

2. In a device of the class described the combination of a container of gas under pressure, a conduit from said gas container for conveying the gas therefrom, a hollow flexing and swishing member capable of creating a disturbance connected with said conduit and through which member said gas passes thereby causing the flexing movement and swishing of said member, a normally closed electro-magnetically operable valve controlling the flow of the gas through the conduit and the flexible and swishing member, an electric circuit, a first make and break switch in said electric circuit effecting the operation of the electro-magnetic valve, a second make and break switch in said electric circuit for completing the same, a continuously operating clock mechanism, a first time cycle means operated by the clock mechanism through a complete cycle in a given length of time, a second time cycle means operated by the clock mechanism through a complete cycle of time and which said second time cycle is a fragment of the time cycle of said first time cycle means, means associated with said second time cycle means for operating the first mentioned make and break switch at intervals during the time cycle thereof, means normally holding said second make and break switch in an open position for breaking the electric circuit, and means operated by said first time cycle means for rendering the last mentioned means inoperative and closing said second make and break switch for completing the electric circuit and making same operative for a part of the time cycle of said first time cycle means.

3. In the device of the class described the combination of a container of gas under pressure, a conduit from said gas container for conveying the gas therefrom, a hollow flexing and swishing member capable of creating a disturbance connected with said conduit and through which member said gas passes thereby causing the flexing movement and swishing of said member, a normally closed electro-magnetically operable valve controlling the flow of the gas through the conduit and the flexible and swishing member, an electric circuit, a first make and break switch in said electric circuit effecting the operation of the electro-magnetic valve, a second make and break switch in said electric circuit for completing the same, a continuously operating clock mechanism, a first time cycle means operated by the clock mechanism through a complete cycle in a given length of time, a second time cycle means operated by the clock mechanism through a complete cycle of time and which said second time cycle is a fragment of the time cycle of said first time cycle means, means associated with said second time cycle means for operating the first mentioned make and break switch at intervals during the time cycle thereof, yielding means normally holding said second make and break switch in an open position for breaking the electric circuit, means including a cocking arm operable to a yieldably held cocked position rendering said second make and break switch yieldable opening means inoperable and under tension and closing said second make and break switch, and means associated with said first time cycle means cocking said cocking arm a part of the time cycle of said first time cycle means, uncocking said cocking arm, and opening said second make and break switch through its yieldable opening means for opening the electric circuit and making same inoperative for a part of the time cycle of said first time cycle means.

4. In a device of the class described the combination of a container of gas under pressure, a conduit from said gas container for conveying the gas therefrom, a hollow flexing and swishing member capable of creating a disturbance connected with said conduit and through which member said gas passes thereby causing the flexible movement and swishing of said member, a normally closed electro-magnetically operable valve controlling the flow of the gas through the conduit and the flexible and swishing member, an electric circuit, a first make and break switch in said electric circuit effecting the operation of the electro-magnetic valve, a second make and break switch in said electric circuit for completing the same, a continuously operating clock mechanism, a first time cycle means operated by the clock mechanism through a complete cycle in a given length of time, a second time cycle means operated by the clock mechanism through a complete cycle of time and which said second time cycle is a fragment of the time cycle of said first time cycle means, means associated with said second time cycle means for operating the first mentioned make and break switch at intervals during the time cycle thereof, yielding means normally holding said second make and break switch in an open position for breaking the electric circuit, means including a cocking arm operable to a yieldably held cocked position rendering said second make and break switch yieldable opening means inoperable and under tension and closing said second make and break switch, a plurality of individual members selectively positioned with respect to the time cycle of said first time cycle means and operated thereby for individually and successively cocking said cocking arm each for a successive part of the time cycle of said first time cycle means and closing said second make and break switch for completing the electric circuit and making same operative for said successive parts of the time cycle of said first time cycle means, and means operable by the clock mechanism uncocking said cocking arm and effecting the opening of said second make and break switch through its yieldable opening means prior to the operation of the succeeding cocking member.

5. In a device of the class described the combination of a container of gas under pressure, a conduit from said gas container for conveying the gas therefrom, a hollow flexing and swishing member capable of creating a disturbance connected with said conduit and through which member said gas passes thereby causing the flexing movement and swishing of said member, a normally closed electro-magnetically operable valve controlling the flow of the gas through the conduit and the flexible and swishing member, yieldable means normally closing said valve, an electric circuit including the electro-magnetically operated valve, a first make and break switch in said electric circuit effecting the operation of the electro-magnetic valve, a second make and break switch in said electric circuit for completing the same, a continuously operating clock mechanism, a first time cycle means operated by the clock mechanism through a complete cycle in a given length of time, a second time cycle means operated by the clock mechanism through a complete cycle of time and which said second time cycle is a fragment of the time cycle of said first time cycle means, means associated with said second time cycle means for operating the first mentioned make and break switch at intervals during the time cycle thereof to open said valve, means delaying the closing of the valve by the yieldable closing means, and means associated with said first time cycle means closing said second make and break switch for completing the electric circuit and making same operative for a part of the time cycle of said first time cycle means.

6. In a device of the class described the combination of a container of gas under pressure, a conduit from said gas container for conveying the gas therefrom, a hollow flexing and swishing member capable of creating a disturbance connected with said conduit and through which member said gas passes thereby causing the flexing movement and swishing of said member, a normally closed electro-magnetically operable valve controlling the flow of the gas through the conduit and the flexible and swishing member, a second hollow member through which gas passes to create a disturbance, a normally closed electro-magnetically operable valve controlling the flow of the gas through the conduit and said second disturbance creating member, an electric circuit including the electro-magnetically operated valves of said flexing and swishing member and said second disturbance creating member with said valves in parallel in said electric circuit, a first make and break switch in said electric circuit effecting the operation of the electro-magnetic valve, a second make and break switch in said electric circuit for completing the same, a continuously operating clock mechanism, a first time cycle means operated by the clock mechanism through a complete cycle in a given length of time, a second time cycle means operated by the clock mechanism through a complete cycle of time and which said second time cycle is a fragment of the time cycle of said first time cycle means, means associated with said second time cycle means for operating the first mentioned make and break switch at intervals during the time cycle thereof, and means associated with said first time cycle means closing said second make and break switch for completing the electric circuit and making same operative for a part of the time cycle of said first time cycle means.

7. In a device of the class described the combination of a container of gas under pressure, a conduit from said gas container for conveying the gas therefrom, a hollow flexing and swishing member capable of creating a disturbance connected with said conduit and through which member said gas passes thereby causing the flexing movement and swishing of said member, a normally closed electro-magnetically operable valve controlling the flow of the gas through the conduit and the flexible and swishing member, a second hollow member through which gas passes to create a disturbance, a normally closed electro-magnetically operable valve controlling the flow of the gas through the conduit and said second disturbance creating member, yieldable means associated with each valve for closing same, an electric circuit including the electro-magnetically operated valves of said flexing and swishing member and said second disturbance creating member with said valves in parallel in said electric circuit, a first make and break switch in said electric circuit effecting the operation of the electro-magnetic valves, a second make and break switch in said electric circuit for completing the same, a continuously operating clock mechanism, a first time cycle means operated by the clock mechanism through a complete cycle in a given length of time, a second time cycle means operated by the clock mechanism through a complete cycle of time and which said second time cycle is a fragment of the time cycle of said first time cycle means, means associated with said second time cycle means for operating the first mentioned make and break switch at intervals during the time cycle thereof to open said valves, means associated with each valve delaying the closing of its valve by the yieldable closing means, and means associated with said first time cycle means closing said second make and break switch for completing the electric circuit and making same operative for a part of the time cycle of said first time cycle means.

References Cited in the file of this patent
UNITED STATES PATENTS

| | | |
|---|---|---|
| 2,178,986 | Caldwell | Nov. 7, 1939 |
| 2,304,358 | Hennefer | Dec. 8, 1942 |
| 2,917,736 | Marotta | Dec. 15, 1959 |

UNITED STATES PATENT OFFICE
CERTIFICATE OF CORRECTION

Patent No. 3,113,304

December 3, 1963

Frank M. Lindley

It is hereby certified that error appears in the above numbered patent requiring correction and that the said Letters Patent should read as corrected below.

Column 8, lines 71 and 72, strike out "mechanism through a complete cycle of time and which said second".

Signed and sealed this 28th day of April 1964.

(SEAL)
Attest:
ERNEST W. SWIDER
Attesting Officer

EDWARD J. BRENNER
Commissioner of Patents